United States Patent [19]

Scheppele

[11] 4,203,513
[45] May 20, 1980

[54] METERING APPARATUS

[75] Inventor: Lyle W. Scheppele, Dubuque, Iowa

[73] Assignee: Toledo Stamping & Manufacturing Company, Toledo, Ohio

[21] Appl. No.: 893,442

[22] Filed: Apr. 4, 1978

[51] Int. Cl.² .............................................. B65G 37/00
[52] U.S. Cl. ..................................... 198/620; 198/502
[58] Field of Search ............... 198/494, 496, 497, 498, 198/502, 575, 620, 622, 331; 222/16, 59, 415

[56] References Cited

U.S. PATENT DOCUMENTS

| | | | |
|---|---|---|---|
| 1,791,482 | 2/1931 | Thomas | 198/497 |
| 2,301,088 | 11/1942 | Stahl | 198/620 |
| 3,161,285 | 12/1964 | Hummer et al. | 198/498 |
| 3,300,024 | 1/1967 | Grau | 198/502 |
| 3,817,368 | 6/1974 | Wentz et al. | 198/575 |

Primary Examiner—Jeffrey V. Nase
Attorney, Agent, or Firm—Allen D. Gutchess, Jr.

[57] ABSTRACT

Volumetric metering apparatus is provided for measuring freely-flowing material, especially cattle feed. The apparatus includes a belt conveyor along which the feed is moved and a metering roll located thereabove. The metering roll is mounted on a shaft which is rotatably supported by a pair of arms pivotally supported above the belt on side walls of the conveyor. The metering roll actuates a counter at a rate depending upon the amount of feed on the belt and the distance the roll is above the conveyor belt. The return run of the conveyor belt engages a drive roll which, through a suitable drive train, drives the metering roll at a speed equal to the speed of the belt. The drive train between the drive roll and the metering roll includes intermediate drive and driven members located at the pivot points of the arms so that the final driven member on the metering roll shaft will always be at the same distance from the intermediate drive member and the pivot points of the arms.

2 Claims, 3 Drawing Figures

METERING APPARATUS

This invention relates to volumetric metering apparatus for freely-flowing materials and specifically for particulate cattle feed such as grains, silage, and chopped hay.

The metering apparatus includes a belt conveyor along which the particulate material or feed is moved. A metering roll is positioned above a portion of the belt and is in contact therewith when there is no feed thereon. As the depth of the feed moved along the belt increases, the roll accordingly moves upwardly. A counter is operated by the roll and is actuated faster as the roll moves upwardly. When the counter reaches zero from a predetermined number set thereon, supplying of the feed is stopped, either by stopping the conveyor belt or by stopping the flow of feed through a supply hopper, or both. A metering roll and counting mechanism of the type herein employed is shown and described in more detail in U.S. Pat. No. 3,300,024.

The metering roll is mounted on a shaft which is pivotally carried on ends of two arms. The arms extend generally longitudinally of the conveyor with their other ends pivotally mounted above the conveyor belt on side walls of the conveyor. The arms thus pivot as the metering roll moves up and down relative to the conveyor belt.

The metering roll is driven preferably at the same speed as the conveyor belt. For this purpose, a drive roll and two pinch rolls are engaged by the lower run of the belt, with the belt winding in an undulating manner about the three rolls. The drive roll rotates a drive member which can be a pulley, sprocket, or gear which drives an intermediate driven member affixed to an intermediate drive member, the two of which are located on a rod or axle at the pivot points of the arms, with the intermediate drive member driving a driven member located on the shaft for the metering roll. With this arrangement, the intermediate drive member and the driven member always remain a fixed distance apart for any position of the metering roll. By driving the metering roll in this manner, the particulate material or feed will not tend to pile up in front of the metering roll as can occur when the roll is not driven with a more accurate measurement consequently also being accomplished. The conveyor belt also will not wear as much when the driven metering roll is in contact therewith and moving at the same speed.

It is, therefore, a principal object of the invention to provide improved metering apparatus embodying a metering roll located above a belt and pivotally mounted on a pair of arms for movement toward and away from the belt.

Another object of the invention is to provide improved metering apparatus including a conveyor belt with a metering roll thereabove with the roll being driven by a drive roll and engaged by the return run of the belt to drive the metering roll at the same speed as the upper run of the belt.

Many other objects and advantages of the invention will be apparent from the following detailed description of a preferred embodiment thereof, reference being made to the accompanying drawings, in which.

Figure 1:
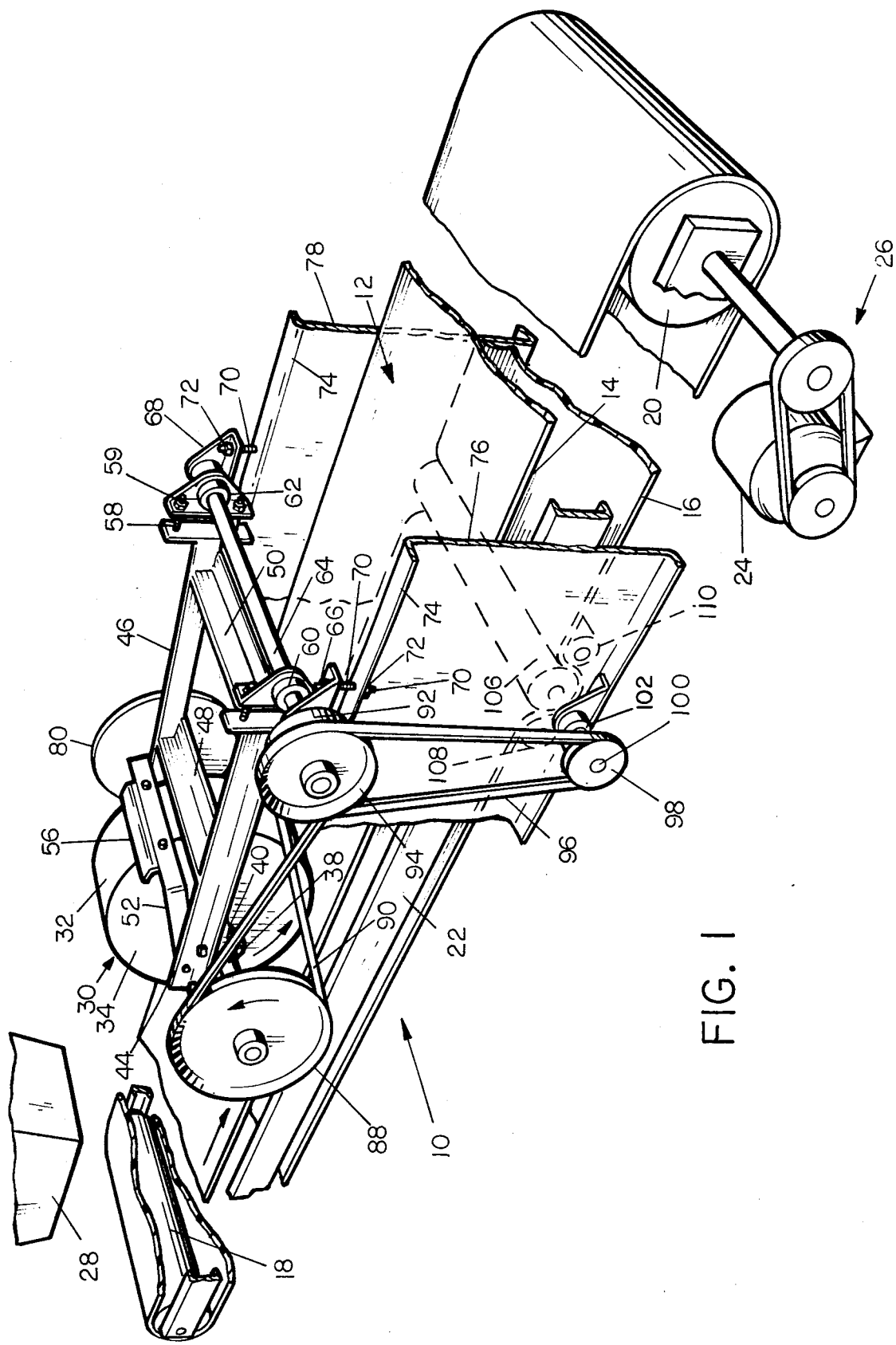
FIG. 1 is a fragmentary view in perspective of metering apparatus embodying the invention.

Referring to the drawings and particularly to FIG. 1, a belt conveyor indicated at 10 includes a belt 12 having an upper run 14 and a lower run 16. The belt extends around a head roll 18 and a tail roll 20 with a suitable horizontal bed (not shown) therebetween to support the upper run of the belt. The various rolls and components are supported by suitable longitudinally-extending frame members 22. The tail roll 18 is driven through a motor 24 and a chain and sprocket combination 26. A feed supply hopper 28 is located above the charge end of the belt 12. The hopper can have rotatable fingers therein to aid in supplying particulate material, usually cattle feed, from a source thereabove to the belt 12.

A generally cylindrical metering roll or member 30 is positioned above the belt and is in contact with it when there is no feed thereon. The metering roll includes a cylindrical surface 32 which has a width about half the width of the belt and is of hollow construction, having circular end walls 34 and 36 which are affixed to a shaft 38. The shaft 38 is mounted in bearing blocks 40 and 42 and extends outwardly beyond both of them. The bearing blocks, in turn, are affixed to end portions of arms 44 and 46 which extend generally longitudinally of the conveyor. The arms are spaced apart by cross frame members 48 and 50 and also have diagonal struts 52 and 54 carrying a scraper 56 engagable with the surface 32 of the metering roll 30.

The other ends of the arms 44 and 46 are adjustably connected by bolts 58 and nuts 59 to bearing blocks 60 and 62. A pivot rod or axle 64 is rotatably carried by the bearing blocks 60 and 62, extending through them and supported beyond by bearing blocks 66 and 68. These, in turn, are adjustably connected by bolts 70 and nuts 72 to upper flanges 74 of side walls 76 and 78 which actually extend the length of the conveyor 10, being shown only in part for purposes of illustration.

Figure 2:
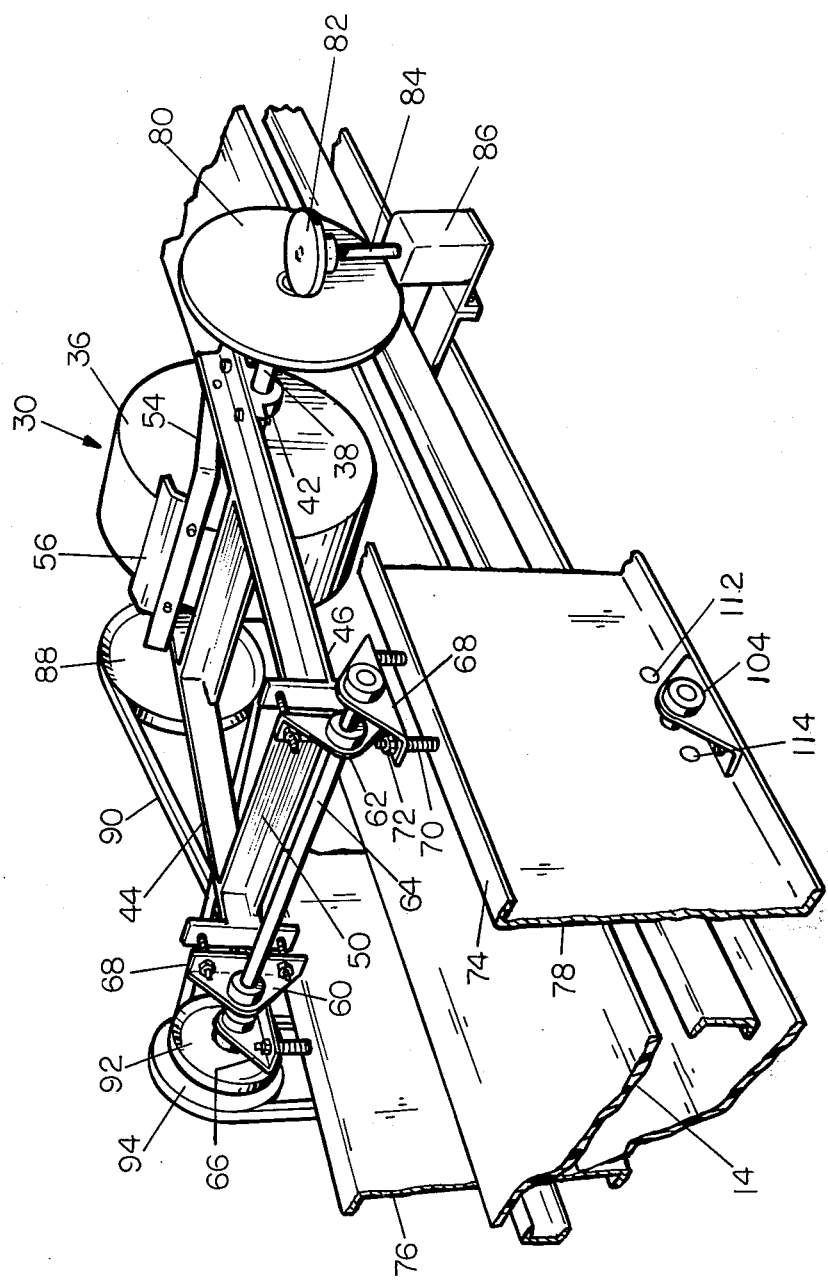
FIG. 2 is a fragmentary view in perspective of the metering apparatus taken from the other side.
Figure 3:
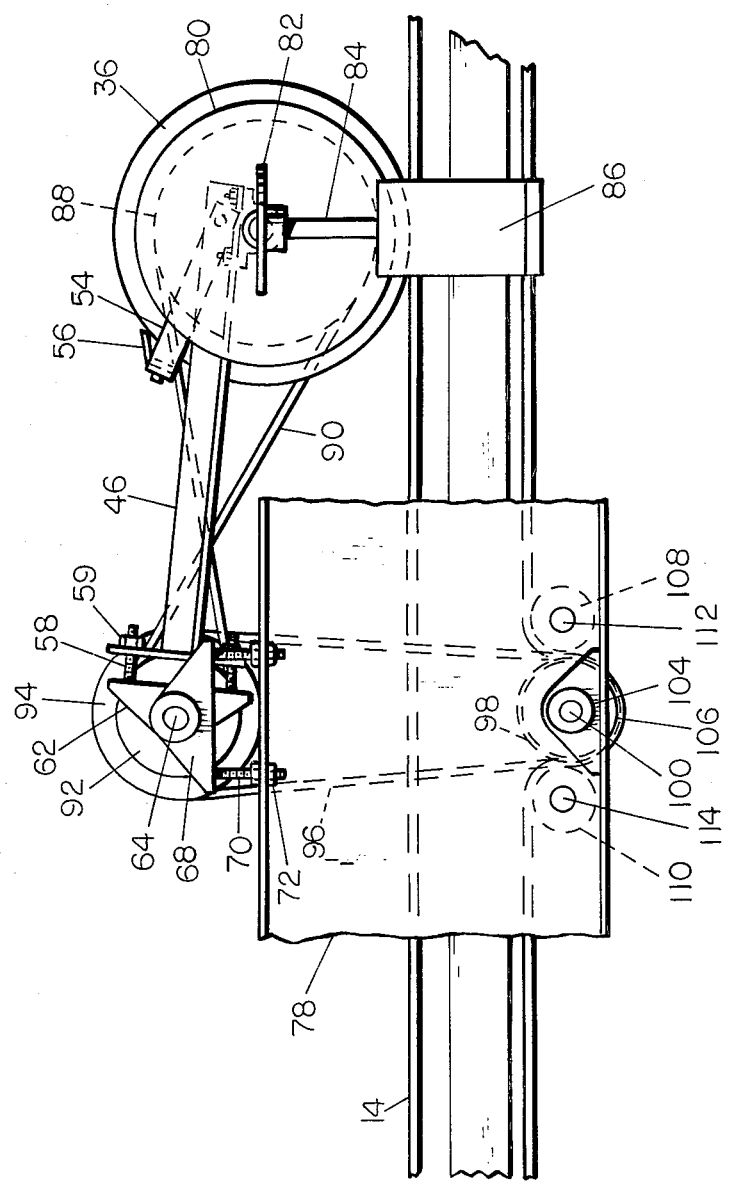
FIG. 3 is a fragmentary view in elevation of the metering apparatus taken from the same side as FIG. 2.

As shown in FIGS. 2 and 3, a disc 80 is affixed to one end of the shaft 38, beyond the bearing block 42. A counting wheel 82 engages the outer surface of the disc 80 and is connected through a shaft 84 to a subtraction counter 86 which is known in the art. When there is no feed on the belt 12, and the metering roll 30 is in contact therewith, the counting wheel 82 engages the center of the disc 80 and does not rotate even though the roll 30 and the disc 80 are rotating. However, as feed moves along the belt, it pushes the metering roll 36 upwardly so that the counting wheel 82 engages the disc 80 below the center thereof and begins to rotate. As the depth of the feed on the belt increases, the metering roll 30 moves upwardly farther and the counting wheel 82 engages the disc 80 farther from the center thereof, causing the counting wheel to rotate faster. To supply a predetermined amount of feed, the operator sets a predetermined number on the subtraction counter 86. When the number reaches zero, through suitable circuitry, the counter will stop the conveyor 10 or stop the supply of feed through the hopper 28. Of course, the greater the depth and volume of feed on the belt, the faster the counting wheel 82 will rotate and faster the counter will reach zero and stop the supply of feed.

In accordance with the invention, the metering roll 30 is driven in a manner so that the surface 32 closest to the upper run 14 of the belt 12 will move in the same direction and at the same speed as the belt. For this purpose, the end of the shaft 38 opposite the disc 80 has a driven member or pulley 88 affixed thereto and connected by a crossed belt 90 to an intermediate member or drive pulley 92. The drive pulley 92 is rotatably mounted on the rod 64 about which the arms 44 and 46 pivot so that the drive pulley 92 and the driven pulley 88 will always remain apart a fixed distance. The intermediate drive pulley 92 is affixed to an intermediate driven member or pulley 94 which is also freely rotatable on the rod 64. The pulley 94 is connected by a belt 96 with a drive member or pulley 98 affixed to a shaft 100. The shaft 100 is rotatably carried by bearing blocks 102 and 104 mounted on lower flanges of the side walls 76 and 78.

The shaft 100 has a drive roller 106 affixed thereto with pinch rolls 108 and 110 located on each side thereof. These have axles 112 and 114 suitably mounted in the side walls 76 and 78. The lower run 16 of the belt 12 extends over the pinch roll 108, under the drive roller 106, and back over the pinch roll 110. This provides approximately 180° engagement of the drive roll 106 relative to the belt to enable the belt to rotate the drive roll without slippage. The roll 106, in turn, drives the drive pulley 98 which, through the belt 96, drives the intermediate driven pulley 94. The intermediate drive pulley 92, in turn, being affixed to the intermediate driven pulley 94, drives the driven pulley 88 in the opposite direction through the crossed belt 90. The metering roll 30 thereby is driven through the shaft 38 with the peripheral speed of the circular surface 32 equaling the speed of the belt by the proper selection of the pulley diameters. Of course, chains and sprockets or gears could be employed in place of the pulleys and belts.

With this arrangement, the feed will not pile up in front of the metering roll 30 as can otherwise occur and more accurate measuring can be effected. The belt 12 also does not wear to any extent when the roll 30 is in contact with it and moving at the same speed. Also, the pivotal arms 44 and 46 retain the metering roll 30 perpendicular to the belt 12 and yet enables the roll to freely move up and down with minimum friction and without jamming.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. Metering apparatus for metering feed comprising a conveyor belt having an upper run and a lower run, a generally cylindrical metering member located above a portion of the upper run of said belt, a shaft extending transversely of said belt on which said generally cylindrical metering member is mounted, a pair of arms having end portions rotatably carrying said shaft, a pivot rod mounted on the other end portions of said arms, means supporting said pivot rod above the upper run of said belt, a driven member mounted on said shaft, an intermediate drive member rotatably mounted on said pivot rod, an intermediate driven member rotatably mounted on said pivot rod and rotatable with said intermediate drive member, a drive member, a drive roller engaged with an upper surface of the lower run of said belt and connected to said drive member to rotate same, a pinch roll on each side of said drive roller with the lower run of said belt extending around said drive roller between said pinch rolls, means connecting said drive member and said intermediate driven member, and means connecting said intermediate drive member and said driven member to rotate said generally cylindrical metering member when said roller is driven by said belt, said metering member being rotated with a peripheral speed substantially equal to the lineal speed of said belt.

2. Apparatus for metering feed comprising a conveyor belt having an upper run and a lower run, a generally cylindrical metering member located above a portion of the upper run of said belt, a shaft extending transversely of said belt on which said cylindrical metering member is mounted, a pair of arms extending longitudinally of said conveyor belt and having end portions carrying said shaft, a pivot rod engaging said arms at locations spaced from said shaft, means supporting said pivot rod above the upper run of said conveyor belt, a driven member with a circular periphery mounted on said shaft beyond one edge of said belt, a generally cylindrical drive roller engaged with the lower run of said belt, a pinch roll on each side of said drive roller engageable with the lower run of said belt, an intermediate drive member located on said pivot rod and connected to said driven member for driving said driven member, an intermediate driven member located on said pivot rod and connected to said drive roller to rotate when said drive roller is driven, said drive roller and said drive and driven members being sized to cause said cylindrical metering member to rotate at a peripheral speed equal to the lineal speed of said belt.

* * * * *